March 26, 1940.  D. A. WALLACE  2,195,051
LAPPING APPARATUS
Filed Jan. 30, 1937
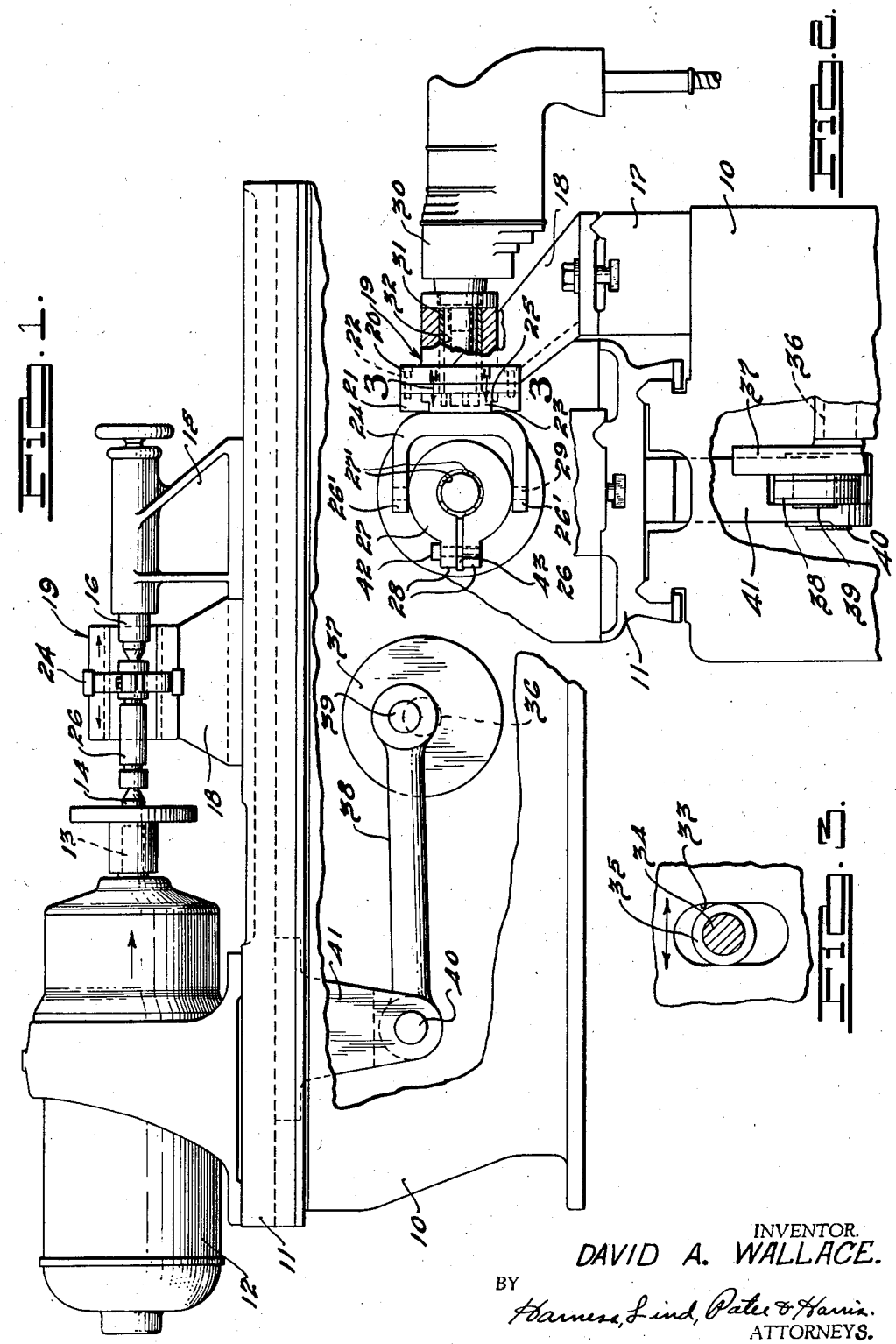
INVENTOR.
DAVID A. WALLACE.
BY
*Harness, Lind, Pates & Harris*
ATTORNEYS.

Patented Mar. 26, 1940

2,195,051

UNITED STATES PATENT OFFICE 2,195,051

LAPPING APPARATUS

David A. Wallace, Detroit, Mich., assignor to Chrysler Corporation, Highland Park, Mich., a corporation of Delaware Application January 30, 1937, Serial No. 123,118

7 Claims. (Cl. 51—64)

This invention relates to improved apparatus for lapping cylindrical members.

Particularly, the invention pertains to improvements in the method of and apparatus for lapping external cylindrical surfaces of plug gauges, shafts and the like.

One of the main objects of the invention is to provide lapping apparatus by which the work can be simultaneously rotated with respect to a fixed axis and subjected to one stage of reciprocatory movement during application thereto of a lapping element which is undergoing reciprocation of an entirely different order.

Another object of the invention is to provide apparatus of this character by which the lapping element may be reciprocated at a speed of a substantially vibratory order while applied to a piece of work which is at the same time reciprocating at a lower speed and throughout a longer course and rotating about an axis extending substantially parallel to the courses of said reciprocatory movements.

A further object of the invention is to provide a lapping operation of this character by which the machine formed grooves and ridges of the surface operated upon can be removed without producing lapping formed surface scratches.

An additional object of the invention is the provision of lapping apparatus by which is produced relative movements between the piece of work and the lapping element that is the result of a plurality of different component movements in excess of two components, of which each component is confined to one characteristic of the contour desired in order to facilitate bringing of the work to a predetermined contour within a high degree of accuracy.

An illustrative embodiment of the invention is shown in the accompanying drawing, in which:

Fig. 1 is a fragmentary side elevational view of a lapping machine embodying the invention.

Fig. 2 is a fragmentary, right end elevational view of the apparatus illustrated in Fig. 1.

Fig. 3 is a fragmentary vertical sectional view taken on the line 3—3 of Fig. 2.

In the form of the invention illustrated in the drawing, the improved lapping apparatus comprises a base structure 10 on which is slidably mounted a longitudinally reciprocable carriage 11. Rigidly mounted on the carriage 11 is a motor 12, or other suitable driving means, having a shaft 13 provided with a live spindle 14.

A dead spindle fixture 15 is longitudinally adjustably mounted on the carriage 11 and provided with a dead spindle 16 which is in axial alignment with the live spindle 14.

Mounted on the base structure 10 adjacent the reciprocable carriage 11 and between the live and dead spindles 14 and 16, respectively, is a tool fixture 17 which is stationary with respect to the reciprocating movement of the carriage 11. The fixture 17 includes an arm 18 on the upper end of which is provided the lapping tool supporting head structure, generally designated by the numeral 19, comprising fixed and removable plate members 20 and 21, respectively, which are detachably connected together by screws 22. Slidably engaged between the plates 20 and 21 is a shank 23 of a yoke-shaped member 24, as illustrated in Fig. 2. The shank 23 has flanges on its extremity which are accommodated in grooves 25 formed in the plate 21. The grooves 25 of the plate 21 serve to confine the movement of the yoke shaped member 24 to a course substantially parallel to the axis of rotation of the live spindle and the work 26. Pivotally mounted on the yoke 24 between the arms 26' thereof is a lapping element carrier 27 comprising a split ring having outwardly extending lugs 28 by which the ring may be contracted in order to apply lapping elements 27' mounted in the carrier 27 to the work 26. The lapping element carrier 27 is pivotally supported by pins 29 which are received in apertures formed in the outer end portions of the arms 26' of the yoke 24.

Mounted on the head 19 of the fixture arm 18 is an electric motor 30, or other suitable driving means, having a shaft 31 extending through a passage 32 in the head 19 and through registering openings in the plates 20 and 21. The left extremity of the cross head portion 23 of the yoke 24, as illustrated in Fig. 2, is provided with a recess 33 which is elongated and which extends transversely of the axis of the shaft 31. The right extremity of the shaft 31 has an eccentrically located pin 34 which is received in the recess and on which is mounted a bearing member 35. The bearing member 35 is confined between the opposite side walls of the recess 33 and thus during rotation of the shaft 31 by the motor 30, the yoke 24 and lapping elements 27' are reciprocated in the direction of the axis of the work 26. The motor 30 is preferably operated at a speed such that from 900 to 2300 reciprocations per minute of the lapping elements 27' will be produced. The length of the stroke of the reciprocatory movement of the yoke 24 and lapping elements 27' produced by the motor 30 is relatively short but the reciprocations occur at a comparatively high frequency.

The work 26 is reciprocated relative to the lapping tool fixture 17 and lapping elements 27' by driving mechanism, which drives a shaft 36 journalled in suitable bearings carried by the base structure 10 of the lapping machine and operatively connected with a driving member (not shown). Mounted on the shaft 36 is a crank disc 37 on which the right end of a link 38 is eccentrically pivoted at 39. The left end of the link 38 is pivotally attached at 40 to a bracket 41 rigidly secured to the lower side of the shiftable carriage 11. During rotation of the crank disc 37 by the shaft 36 the carriage 11, motor 12, and dead spindle support 15, together with the work 26, are reciprocated in the direction of the axis of the work, preferably at a speed of from 100 reciprocations to 300 reciprocations a minute and throughout a comparatively longer stroke than that of the reciprocatory movement of the lapping elements 27'. The work is rotated by the motor 12 during the two stages of relative reciprocatory movement of the work and lapping stones, preferably at from 100 to 300 R. P. M. but naturally these rotative and reciprocatory speeds may be varied in accordance with the dimensions and nature of the work.

With the foregoing apparatus, relative movement is produced between the lapping elements of the work which is a resultant of a plurality of component movements and therefore repeated application of any localized hard spots or grains of the lapping elements to the same area of the work is effectively guarded against. The relative reciprocatory movements of the lapping elements and the work at comparatively different speeds throughout different lengths of strokes assures that the surface operated upon will be brought to a truly cylindrically contour of a predetermined diameter. The pressure applied by the lapping element 27' on the work may be predetermined by adjustment of the set screw 42 and may be limited by inserting a suitable shim 43 between the outwardly extending lugs 28 of the lapping element carrier.

The relative movement produced between the lapping element and the work by the foregoing apparatus and method therefore assures bringing of the surface to a high degree of smoothness while removing all machine formed ridges and without scratching the surface by repeatedly applying localized hard areas of the lapping element to the same area of the work. The combined relative rotary and two stage reciprocatory movements of the work and lapping elements facilitate the bringing of the external surface of the work to true cylindrical contour.

Although but one specific embodiment of the invention is herein shown and described, it will be understood that various changes in the size, shape and arrangement of parts may be made without departing from the spirit of my invention.

What I claim is:

1. Lapping apparatus comprising a support, a carriage shiftably mounted on said support, means on said carriage for rotatably supporting and drivingly rotating a piece of work about an axis substantially parallel to the direction of shifting movement of said carriage, a tool fixture mounted on said support, a lapping tool on said fixture, including a main body portion and a lapping element engageable with said work and shiftably mounted on said main body portion for reciprocatory movement in a course substantially parallel to said axis, and means for drivingly reciprocating said lapping element relative to said body portion and for drivingly reciprocating said carriage respectively at respectively different speeds and throughout correspondingly different lengths of stroke, said last mentioned means being so constructed and arranged as to reciprocate said carriage at a slower speed than that of said lapping element but throughout a number of strokes substantially corresponding to the number of rotations of said work per unit of time.

2. Lapping apparatus comprising a support, a carriage shiftably mounted on said support, means on said carriage for rotatably supporting and drivingly rotating a piece of work about an axis substantially parallel to the direction of shifting movement of said carriage, a tool fixture mounted on said support including a lapping element engageable with said work and shiftably mounted on said fixture for reciprocatory movement in a course substantially parallel to said axis, means for drivingly reciprocating said lapping element throughout a relatively short stroke at a comparatively high speed, and means for drivingly reciprocating said carriage throughout a longer stroke at a correspondingly slower speed, said latter means being so constructed and arranged as to reciprocate said carriage throughout a number of strokes of the same order as the number of rotations of said work per unit of time.

3. Lapping apparatus comprising a support, a carriage shiftably mounted on said support, means on said carriage for rotatably supporting and drivingly rotating a piece of work about an axis substantially parallel to the direction of shifting movement of said carriage, a tool fixture on said support, a lapping member support shiftably mounted on said fixture for reciprocation in a course substantially parallel to said axis, and a lapping member pivotally mounted on said holder about a pivotal axis substantially normal to the axis of rotation of said work and having lapping elements engageable with said work, and means for drivingly reciprocating said work and said lapping elements simultaneously throughout respectively different lengths of stroke and at correspondingly different speeds, said means being so constructed and arranged as to reciprocate said lapping element at a speed of from 900 to 2300 reciprocations per minute and to reciprocate said work at a speed of from 100 to 300 reciprocations per minute.

4. Lapping apparatus comprising a support, a carriage reciprocably mounted on said support, means on said carriage for rotatably supporting and drivingly rotating a piece of work, means for confining the reciprocatory movement of said carriage to a course substantially parallel to the rotative axis of said work, a tool fixture on said support, a lapping tool on said fixture including a main body portion and a lapping element engageable with said work and shiftably mounted on said main body portion for reciprocatory movement in a course substantially parallel to said axis, and means for drivingly reciprocating said lapping element relative to said main body portion and for drivingly reciprocating said carriage respectively at different speeds and in their said respective courses of reciprocatory movement.

5. Lapping apparatus comprising a support, a carriage reciprocably mounted on said support, means on said carriage for rotatably supporting and drivingly rotating a piece of work, means for confining the reciprocating movement of said carriage to a course substantially parallel to the rotative axis of said work, a tool fixture on said support, a lapping tool on said fixture including a main body portion and a lapping element engageable with said work and shiftably mounted on said main body portion for reciprocatory movement in a course substantially parallel to said axis, and means operable during rotation of said work for drivingly reciprocating said lapping element in its said course relative to said main body portion at a speed of substantially a vibratory order and for drivingly reciprocating said carriage in its said course at a lower speed of substantially higher value than that conventionally employed in feeding successively adjacent portions of a piece of work to a tool.

6. Apparatus for lapping and bringing a surface of a piece of work to true cylindrical contour comprising a support, work holding mechanism on said support including means for drivingly rotating work about an axis concentric with said surface, a lapping tool on said support including a main body portion and a lapping element engageable with said surfaces and shiftably mounted on said main body portion for reciprocatory movement in a course substantially parallel to said axis, said tool and said work being bodily relatively reciprocable with respect to each other in a course substantially parallel to said axis, and means for drivingly reciprocating said lapping element relative to said main body portion of said tool and for drivingly producing relative bodily reciprocation of said tool and work in said respective courses during rotation of said work.

7. Finishing apparatus comprising a base structure, a pair of supports on said base structure, one being relatively linearly shiftable with respect to the other in a predetermined course, means on one of said supports for rotatively mounting and drivingly rotating a piece of work with respect to an axis extending substantially parallel to said course, a finishing tool on the other support including a main body portion and an abrading element engageable with said work and shiftably mounted on said main body portion for reciprocatory movement in a course substantially parallel to said courses and axis, and means for drivingly producing relative reciprocatory movements between said supports and for drivingly reciprocating said abrading element relative to said body portion respectively at different speeds and in their said respective courses of reciprocatory movements.

DAVID A. WALLACE.